Patented Oct. 27, 1936

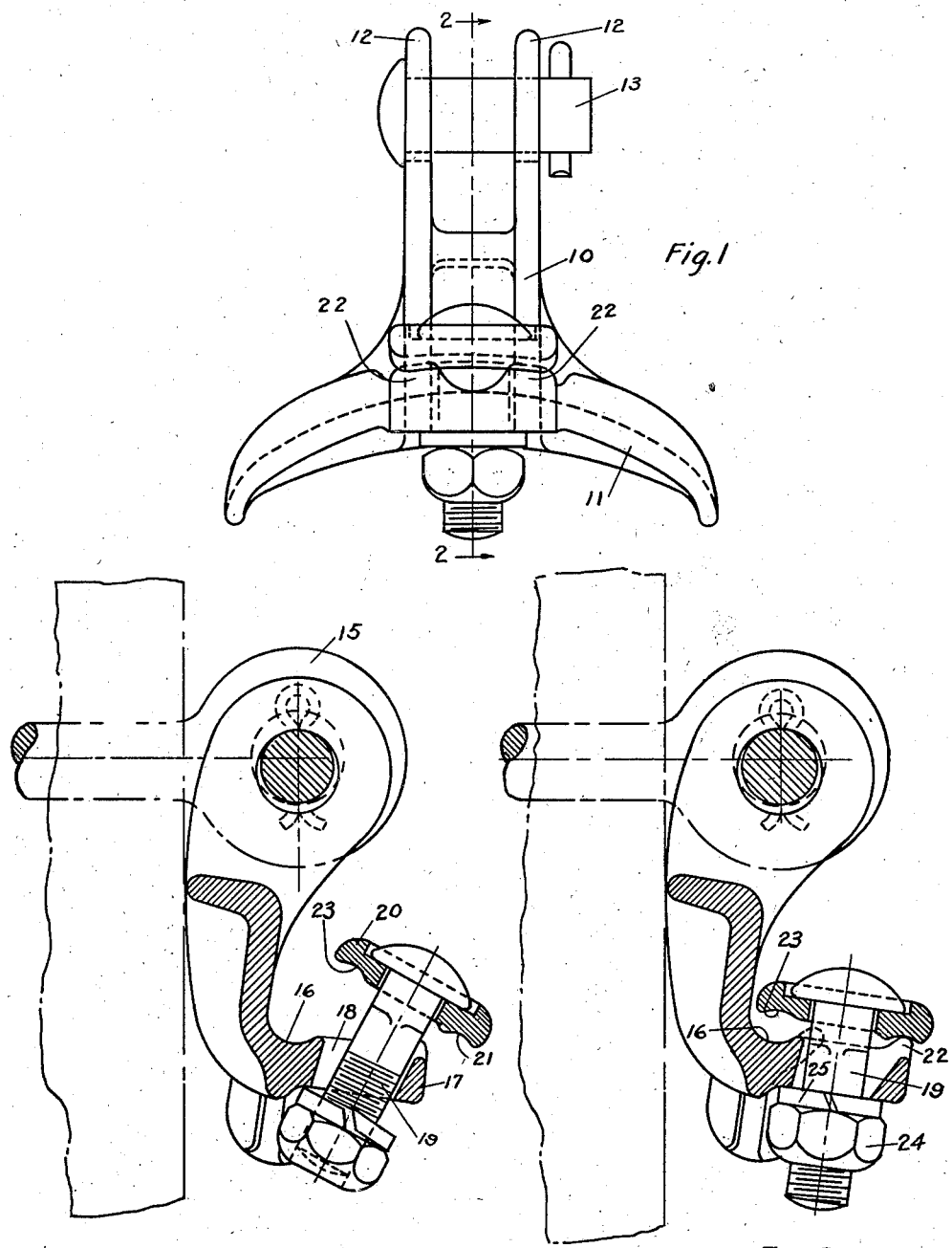

2,058,558

UNITED STATES PATENT OFFICE 2,058,558

CABLE HANGER

Floyd G. Bovard, Akron, Ohio, assignor to The Ohio Brass Company, Mansfield, Ohio, a corporation of New Jersey Application May 29, 1935, Serial No. 23,986

1 Claim. (Cl. 248—63)

This invention relates to supports for cables, such as electrical conductors, and has for one of its objects the provision of a cable support which is simple in construction, economical to manufacture and easy to install.

A further object of the invention is to provide a cable support in which the cable may be secured without detaching any portion of the support.

A further object of the invention is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claim.

In the drawing:

Fig. 1 is an elevation of a support embodying one form of the invention.

Fig. 2 is a section on line 2—2 of Fig. 1 but showing the clamping bolt and head in open position to receive a cable.

Fig. 3 is a view similar to Fig. 2 but showing the clamping bolt and head in cable retaining position.

In the drawing the numeral 10 designates a cable hanger having a transversely extending cable seat portion 11. The ends of the seat portion are curved downwardly to avoid an abrupt shoulder where the cable leaves the seat. The body member may be provided with spaced ears 12 and a clevis pin 13 for connecting the cable with any suitable support 15. In the drawing the hanger is shown as carried directly on the supporting structure without the intervention of any insulating device. This arrangement is suitable for the support of ground wires associated with a transmission line, but it will be understood that where energized conductors are carried by the hanger, suitable insulation will be provided.

The seat portion 11 is provided with a groove or channel 16 for receiving the cable, and at the central portion of the seat member an ear 17 extends laterally of the cable and is provided with an opening 18 for receiving a clamping bolt 19 which fits loosely in the opening. The bolt 19 is provided with a clamping head 20 having a notch 21 arranged to rest upon fulcrum points 22 at the outer edge of the ear 17. The head 20 is also provided with a groove 23 for engaging the top of the cable in the seat 16. A nut 24 is threaded on the lower end of the bolt 19, the threads on the bolt being of sufficient length to permit the nut to be backed off to the position shown in Fig. 2 in which the upper end of the bolt may be tilted to one side so that the cable may be passed to the seat 16 between the inner edge of the clamping head 20 and the supporting shank of the hanger. When the cable is in place in the seat 16, the nut 24 may be tightened, as shown in Fig. 3, so as to cause the cable to be clamped between the groove 23 and the seat 16. In this position the groove 21 rests upon its fulcrum supports 22. A lock washer 25 may be provided for locking the nut 24 in position.

I claim:

A cable clamp comprising an elongated seat, a supporting shank for said clamp forming an abutment wall at one side of said seat, an ear projecting from said clamp at the other side of said seat, the outer edge of said ear away from said seat having a fulcrum bearing thereon, said ear having a perforation therethrough between said seat and said fulcrum bearing, a bolt extending through said perforation and having a clamping head on the upper end thereof, the outer side of which head engages said fulcrum bearing when said head is in clamping position while the inner side of said head overlies said seat but terminates short of the abutment wall formed by said shank, said bolt having a nut thereon for clamping said head upon a cable in said seat, the outer wall of said perforation being inclined upwardly and outwardly to provide for outward tilting movement of the upper end of said bolt when said nut is loosened on said bolt, said bolt having a threaded portion for said nut of sufficient length to permit said head to be moved away from the abutment wall formed by said shank a sufficient distance to provide clearance between said head and wall for the passage of a cable to and from said seat without removing said nut from said bolt.

FLOYD G. BOVARD.